April 28, 1936.  F. A. ROBERTS  2,039,032
COLLAR STRETCHER
Filed July 22, 1935

Frank A. Roberts,
INVENTOR
BY Victor J. Evans & Co.
ATTORNEY

Patented Apr. 28, 1936

2,039,032

UNITED STATES PATENT OFFICE 2,039,032

COLLAR STRETCHER

Frank A. Roberts, Chicago, Ill.

Application July 22, 1935, Serial No. 32,630

1 Claim. (Cl. 223—61).

This invention relates to collar stretchers and more particularly to shirt collar stretchers, and has for its principal object to provide a device which will permit of a shrunk shirt collar being stretched to its original size in minimum time, with minimum manual effort, and without damage to the collar.

A further object is to provide a collar stretcher which will include roughened grips over which the ends of the collar may be placed during the stretching operation, the operator's hands yieldably pressing the ends of the collar against the grips while the device is being closed during the stretching operation, the roughened grips permitting the collar to slide longitudinally but restricting the sliding movement sufficiently to stretch the collar without injury to the fabric.

A further object is to provide a device of this character which will be formed of but two simple parts hinged together, which will be easy to manufacture, and which will be formed of strong durable parts which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1:
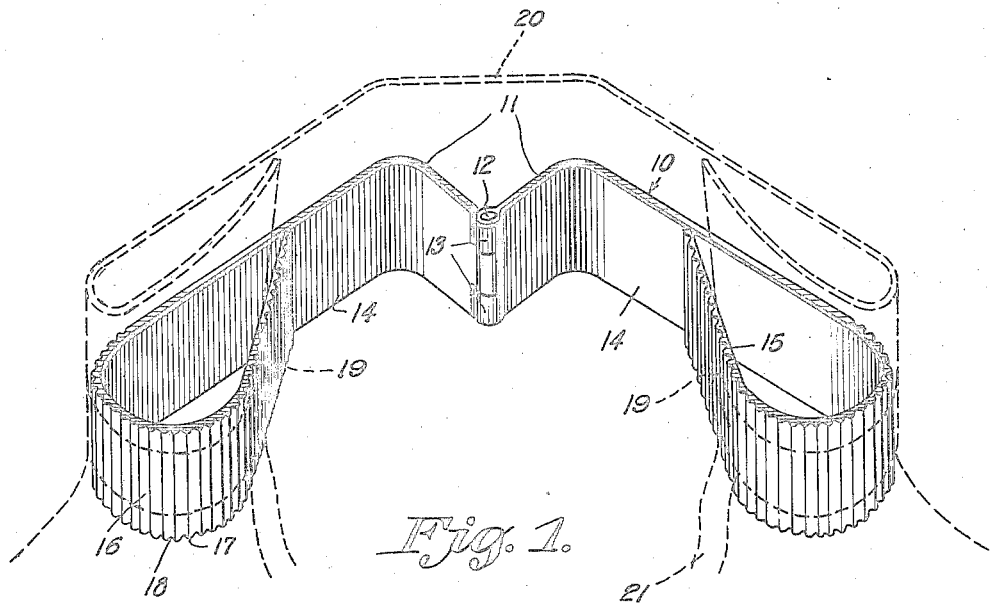
Figure 1 is a perspective view of a collar stretching device constructed in accordance with the invention.

Referring now to the drawing in which like characters of reference designate similar parts in the various views, the device is shown to comprise a pair of L-shaped stretcher elements 10 hingedly connected at the ends of their shorter arms 11 by means of a pintle 12 engaged through interfitting hinge eyes 13 on said shorter arms. The longer arms 14 of the stretcher element each terminate in a loop 15 which is in contact at the free end with the arm, and the outer face of the loop is roughened or corrugated, preferably the corrugations 16 having rounded ridges 17 and valleys 18.

Figure 2:
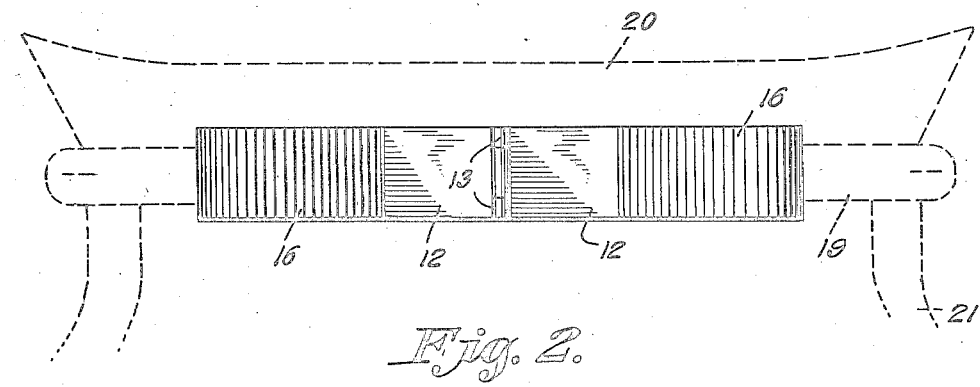
Figure 2 is a plan view of the device in initial position as applied to a collar.

The device may be formed of strap metal or other suitable material and is sufficient in length, when opened so that the short arms 11 are in contact with each other and the long arms 14 are aligned with each other, to extend along the inside of the collar band 19 to nearly the ends of the band, with the collar 20 extending laterally beyond the device on one side and the shirt 21 extending laterally beyond the device on the other side, as best shown in Figure 2.

In operation the device is initially applied to the shirt collar as shown in Figure 2 whereupon the collar with the collar band is bent to embrace the outer roughened surfaces of the loops or grips 15. The operator grips the grips 15, one in each hand, and yieldably clamps the collar and collar band to the roughened surfaces of the grips. Then the operator slowly closes the stretcher elements together, that is rocks the elements on the hinge 12 with the grips 15 moving toward each other, meanwhile clamping the collar only sufficiently tight to permit it to slide in a restricted manner from the roughened surfaces of the grips or loops. In practice it is found that a dry collar will be stretched from one-fourth inch to one-half inch, and when the collar is dampened, it will stretch the collar from one-half inch to one inch. During the stretching operation the fabric is not damaged since the rounded ridges and valleys of the corrugations while retarding the free movement of the ends of the collar, yet present rounded friction surfaces to the material of the collar which surfaces cannot penetrate or mutilate the collar in any manner.

From the above description it will be seen that the invention provides a device for stretching a shirt collar which would otherwise be too tight to be worn due to shrinkage after laundering or other causes, that the device consists of but two movable parts, and that these parts are strongly constructed so that the long life and durability of the device will be greatly promoted.

It will be further noted by referring to Figure 1 that the juncture of the long arm with the short arm of each stretcher element is rounded. The purpose of this construction is to present smooth rounded surfaces which will not bulge the goods and which will slide over the goods smoothly and evenly without injury to the goods during the stretching operation.

What is claimed is:

A collar stretcher comprising a pair of L-shaped stretcher elements hingedly connected at the ends of their shorter arms, and loops at the ends of the longer arms having corrugated outer faces the ridges and valleys of which are rounded.

FRANK A. ROBERTS.